INVENTORS
WALTER A. SIEBEIN
ANTHONY J. ROTOLICO

BY
ATTORNEYS

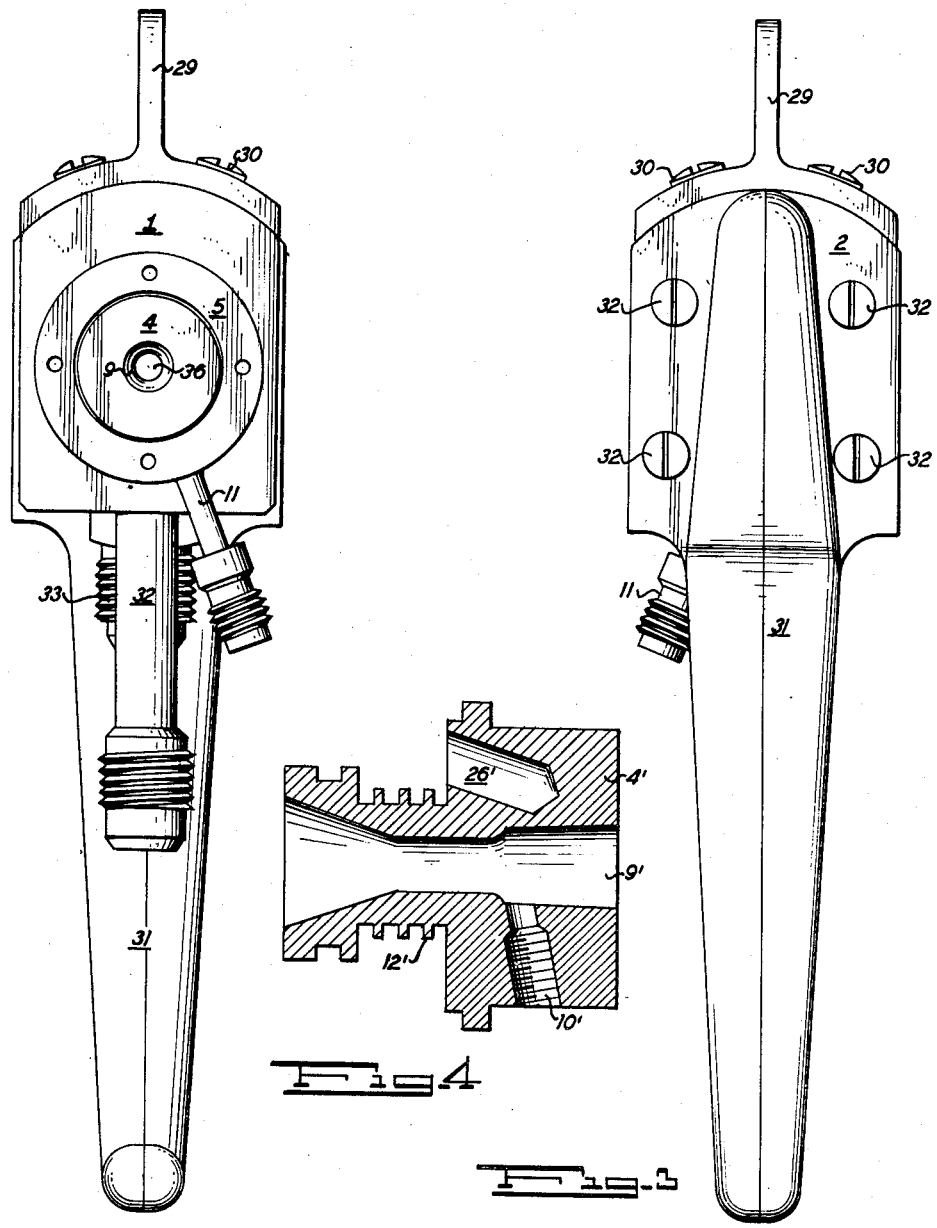

United States Patent Office 3,145,287
Patented Aug. 18, 1964

3,145,287
PLASMA FLAME GENERATOR AND SPRAY GUN
Walter A. Siebein, Smithtown, and Anthony J. Rotolico, Lynbrook, N.Y., assignors to Metco Inc., a corporation of New Jersey
Filed July 14, 1961, Ser. No. 126,827
11 Claims. (Cl. 219—75)

This invention relates to an improved plasma flame generator and spray gun.

Plasma flame generators and spray guns utilizing an electric arc and a flowing gas stream passed in contact with the arc are known and have been used successfully for commercial and experimental purposes. These devices generally consist of an electrode arrangement for striking an arc therebetween, a nozzle and means for passing a stream of gas in contact with the arc and through the nozzle.

In generators of the transferred arc type which are generally used as torches for cutting, welding, and the like, the arc generally extends from an electrode, such as a rod electrode or a flat-faced electrode, such as a disc, to the workpiece through a nozzle, such as a cooled nozzle, while a gas stream is passed concurrently through the nozzle with the arc.

In plasma flame generators of the non-transfer type, the arc is struck between an electrode pair, one of which is in the form of a nozzle, and the gas stream is passed in contact with the arc and through the nozzle.

Plasma flame spray guns, in principle, merely constitute plasma flame generators in which means are provided for passing a heat-fusible material into the arc or the hot affluent from the generator where it can be melted or at least heat-softened and propelled, as for example onto a surface to be coated.

In United States Patent 2,960,594, a plasma generator is described, in which the electric arc is constricted and elongated and passed at least part way down a nozzle by means of a sheath of plasma-forming gas which, in thus acting on the arc, is in itself converted to the plasma energy state and may be utilized as a heating medium. In accordance with the said patent, the sheath of plasma-forming gas after being converted to the plasma state may leave contact with the arc as a free plasma stream, i.e. a plasma which does not directly contribute to the current flow between the electrodes.

The plasma flame generator described in United States Patent 2,960,594 is well suited as the plasma flame generating portion of a plasma flame spray gun as described in United States patent application Ser. No. 745,680, filed June 30, 1958. All plasma flame generators and spray guns are by nature high temperature devices, as plasma is by definition a material in the energy state above this gas state in which atoms of the material are stripped of one or more electrons which are present in the free state. Due to these high operational temperatures, there has been a marked tendency for the nozzles and the electrodes of the devices to melt, become pitted, and to burn out even after relatively short periods of operation. The operational life of the nozzles and/or the electrodes have been extended by efficient water-cooling but efforts have been continuously made in the art to still further increase the operational life of these components, particularly when operating with higher electric power and higher temperature, as the commercial success of the device often depends upon reliability without breakdown or burn-out over prolonged operational periods.

One object of this invention is an improved plasma flame generator and spray gun of improved reliability and dependency having longer nozzle and electrode operational life.

These and still further objects will become apparent from the following description read in conjunction with the drawings in which:

FIG. 2 is a front elevation of the device shown in FIG. 1;

FIG. 3 is a rear elevation of the device shown in FIGS. 1 and 2; and,

FIG. 4 is a vertical section of an embodiment of a different nozzle for the device of FIG. 1.

Figure 1:
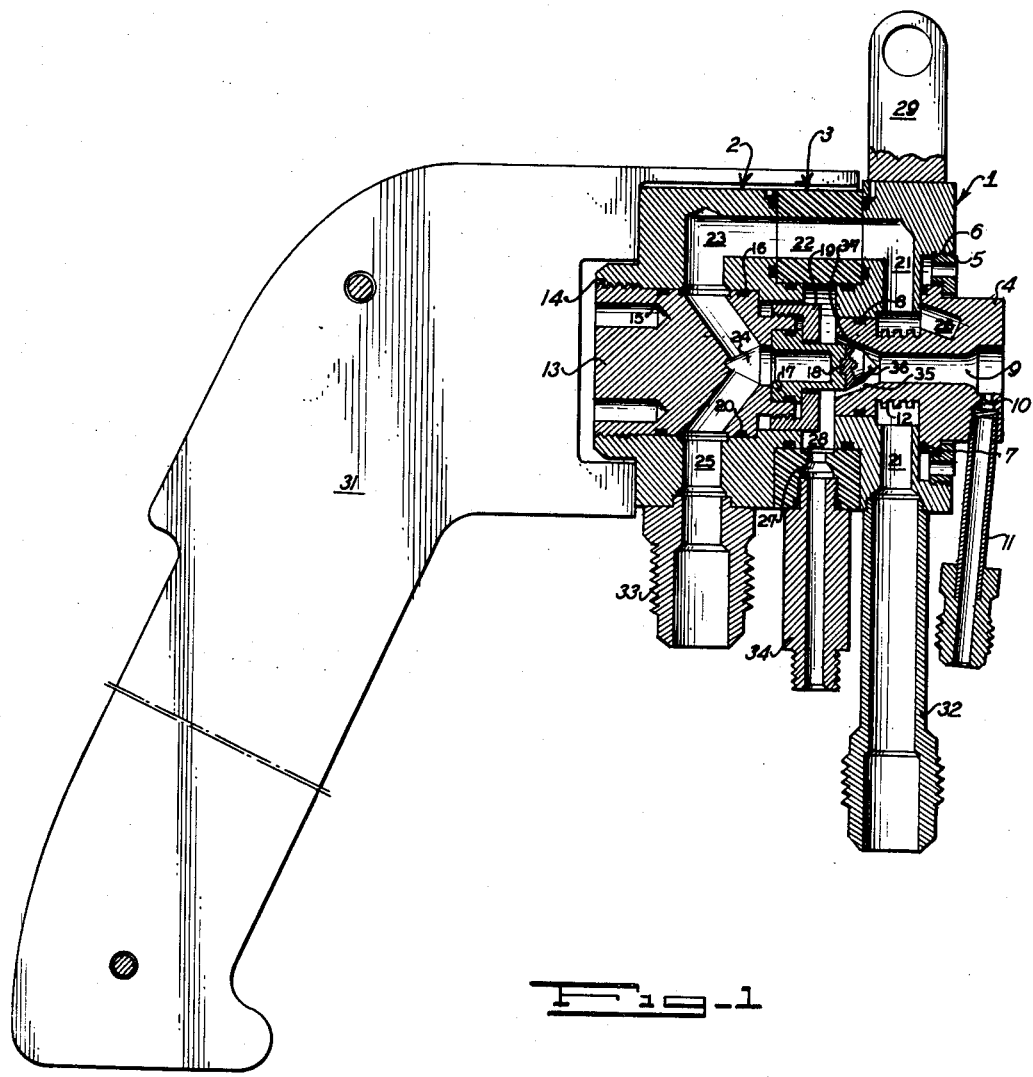
FIG. 1 is a vertical section of an embodiment of a plasma flame spray gun in accordance with the invention.

Referring to the embodiment shown in FIGS. 1 and 3 of the drawing, the gun proper is divided into three sections; i.e., the forward section 1, the rear section 2, and the intermediate section 3. The forward and rear sections, 1 and 2, are constructed of a metal such as copper alloy, steel, aluminum or the like, while the intermediate section 3 is constructed of an electrically insulating synthetic resin, as for example, nylon, a phenolic resin, polyethylene, or the like.

A nozzle electrode 4 of copper or similar conducting material is secured in the forward section 1. The nozzle fits in a corresponding hole or bore in this section and is secured in place by means of the retaining ring 5 which is secured in place by means of the male screw threads 6, screw-threaded into corresponding female threads in the section 1. O-ring seals 7 and 8 ensure a fluid type fit of the nozzle. The nozzle is turned from solid stock, has a single wall construction, and has a central bore 9 which is outwardly tapered at both ends and which is provided at its outlet end with the lateral powder inlet passage 10 to which the powder feed tube 11 is flow-connected. The nozzle is also provided with the integral strengthening and cooling ribs 12.

The rear section 2 is provided with a central opening or hole, coaxial with the nozzle into which the electrode holder 13 is fitted. The electrode holder 13 is secured in place by means of the screw thread connection 14 and sealed by means of the O-ring seals 15 and 16. A rod electrode consisting of the hollow electrode body 17, of copper or the like, and the electrode tip 18, as for example of thoriated tungsten, is secured to the forward end of the electrode holder 13 by means of the screw flange 19. A fluid-tight seal is provided between the electrode and electrode holder by means of the O-ring 20. The electrode tip may be secured to the hollow cylindrical electrode body 17 in any conventional or known manner, as for example by silver soldering.

The intermediate section 3 may be secured to the forward section 1 with machine screws or the like and the rear section 2 may in turn be secured to the intermediate section 3 in a similar manner. Conversely, the rear section 2 may be directly secured to the forward section 1 by elongated insulated screws so that the intermediate section 3 is clamped therebetween. The sealing of the parts is effected by means of O-rings as shown. A passage for cooling water, 21, extends through the forward section 1 surrounding the nozzle. A corresponding passage 22 in the section 3 mates with the passage 21 which, in turn, leads into a further extension 23 of this passage, in the rear section 2. A V-shaped passage 24 communicating with the hollow interior of the rod electrode 17 connects the passage 23 to an outlet passage 25 also defined in the rear section 2.

A number of blind holes 26, as, for example, drilled 40 degrees apart, are in communication with the passage 21 to provide additional cooling of the nozzle 4.

An inlet opening 27 through the intermediate section 3 is provided in communication with the annular space 28 defined in this section and surrounding the rod electrode 17.

A hanging bracket 29 is secured to the section 1 by means of these screws 30 (FIG. 3) and a handle 31 of suitable insulating material, as for example synthetic resin, such as plastic-reinforced fiberglass, phenolic resin, or the like is removably secured to the rear section 2 by means of the screws 32.

A connector 32 for a water cooled electrical cable is secured to the section 1 in communication with the passage 21 and a connector 33 for a water-cooled electric cable is secured to the rear section 2 in communication with the passage 25. A connection 34, for a gas line, is attached to the opening 27 in the intermediate section 3.

The electrode tip 18 is provided with a double taper, i.e. has the tapered portion 35 and the tapered portion 36 terminating at the pointed tip. Portion 36 is tapered more steeply than the portion 35, i.e. the same is inclined at a greater angle with respect to the axis of the electrode than is the portion 35. The entire tip of the rod electrode 17 extends into the entrance end 37 of the nozzle passage 9. The entrance end 37 of the nozzle is tapered at an angle substantially corresponding to the angle of taper of the portion 35 of the rod electrode tip 18, and both the cylindrical portion and the tapered portion 36 of the rod electrode extend in this tapered portion of the nozzle. The rod and electrode, due to their shape and dimensioning, thus define an annular gas flow passage decreasing in cross-sectional flow area to a minimum size opposite tapered portion 35 of the rod electrode and then increasing in cross-sectional flow area at the portion adjacent the tapered section 36 of the rod electrode. This annular gas flow passage in the entrance of the nozzle and around the electrode tip is therefore in the form of a Venturi throat, the purpose of which will be described hereinafter.

In operation water-cooled electrical cables of conventional construction are connected to the connectors 32 and 33. The cables consist of a metallic electrical conductor surrounded by an insulated covering provided with cooling water passages, through which cooling water is forced. The cooling water flows through the passage 21 around the nozzle 4 and its ribs 12, so that in effect the nozzle is in the form of a "wet liner" type nozzle. The water flows through the passage 22 to the passage 23 and through the passage 24 and out through passage 25 and connector 33 to the other water-cooled electric cable connected at 33 to a suitable chain or for recycling after cooling. In flowing through the passage 21 and around the nozzle 4, the water flows into the blind holes 26 increasing the cooling effect. Upon flowing through the passage 24, water flows into the hollow interior of the rod electrode 17, cooling this electrode.

A source of electrical current, as for example, from a conventional welding generator, is connected to the water-cooled electric cables so that a current is caused to flow from the connector 33 through the electrode holder 13 to the electrode 17, and from the tip of the electrode 17 in the form of an arc to the nozzle 4 and then connector 32 back to the generator. A plasma-forming gas, as for example, nitrogen, argon, helium, hydrogen, or the like is passed from a suitable pressure source through the connection 34 into the space 28 around the tip of the electrode 18, through the annular passage formed by the electrode tip 18 and the tapered portion 37 of the nozzle, and out of the nozzle.

An arc is initially struck from the electrode tip 18 to the wall of the nozzle 4 in the conventional manner by providing an initial high-frequency source of alternating current through the electrical cables connected at 32 and 33.

After the arc has thus been initiated with the alternating current, the same will be maintained with direct current from the conventional welding generator as mentioned. The plasma-forming gas flowing from the space 28 through the nozzle will form a sheath around the electric arc, will constrict the arc, and force the same part way down the nozzle. In so constricting and extending the arc, the gas will be converted to a plasma state itself and will leave the arc and the nozzle as a free plasma stream. The operation of the device as described is thus the same as that described in connection with United States Patent 2,960,594 and the same operational conditions as described in said patent are applicable.

Heat-fusible material to be flame sprayed, as for example powdered metal or ceramics which are conventionally sprayed in devices of this type, is passed entrained in a small volume of a carrier gas, as for example inert gas, such as nitrogen, helium, argon, or the like or even air from a conventional feed hopper device through connection 11 and passage 10 and into the enlarged exit portion of the nozzle 4. The powder is preferably injected past the point where the arc strikes the inner wall of the nozzle and the powder will be heat-softened and propelled onto the surface to be coated by the hot free plasma stream flowing out of the nozzle. The material sprayed and the conditions for spraying may be as described in co-pending applications Serial Nos. 745,681 and 835,280, filed June 30, 1958, and August 21, 1959, respectively, the former having now matured into Patent No. 2,960,594, dated November 15, 1960.

In operation, the portion of the electrode tip 18 from which the arc initiates is actually converted to molten form in spite of the water cooling. If this molten metal is adversely disturbed by the gas flow or blown off, the nozzle tip will become pitted and burn out, and in any event will have to be replaced after a certain operational period. Apparently, the shape and dimensioning of the laterally adjacent portions of the rod electrode and the nozzle to define the annular gas flow passage decreasing in cross-sectional flow area to a minimum size, and then increasing in cross-sectional flow area in the down stream flow direction of gas through the nozzle, produces a flow and pressure situation which reduces the pitting and burning out of the electrode to a minimum, and which furthermore increases the nozzle life, thus allowing the device a longer operational life at higher electrical power without replacement of the electrodes and nozzles.

The double tapered shape of the tip of the rod electrode in itself will create a flow pattern therearound which will enhance its operational life.

As a practical example, the nozzle may have a total length of 1.284" and a minimum diameter at its central portion of .218". The length of the tapered inlet portion may be .322" and may be inclined at an angle of 20° 45' from the nozzle axis. The electrode tip 18 extends into the entrance of the nozzle for a depth of .350" and may have a maximum diameter of .351". The first tapered portion may be inclined at an angle of 18° from the electrode axis and the portion 36 inclined at an angle of 49° from the electrode axis. The area of the annular passage between the electrode tip 18 and the adjacent wall of the tapered portion 37 may be .0371 sq. in. at the entrance end, narrowing to .0159 sq. in. at the portion opposite the tapered section 35 of the electrode, and then widening again at the portion opposite the tapered section 26 to .024 sq. in.

The nozzle as shown in FIG. 1 is particularly adapted for metal powders, in that the axis of the passage 10 leading into the nozzle is inclined toward the exit of the nozzle, as for example at an angle of about 5°.

For the spraying of ceramic powder, it has been found preferable to incline the axis of this entrance passage toward the inlet end of the nozzle, as for example, at an angle of about 10° as shown in FIG. 4 wherein the nozzle body itself is designated 4' and the nozzle passage 9', the lateral powder entrance passage 10', the cooling and strengthening ribs 12' and the blind drilled cooling holes 26'.

The nozzle as shown in FIG. 1 may very easily be removed for replacement or exchange by merely unscrewing the retaining ring 5, pulling the nozzle out and sliding a different nozzle in place, as for example the nozzle as shown in FIG. 4, and again screwing down the retaining ring 5.

The rod electrode may be removed and replaced, after removing the handle 31, by unscrewing the electrode holder 13 and sliding the same out from the gun. The electrode 17 proper may be removed and replaced by simply unscrewing the screw flange 19 and sliding the same out from the holder.

The gun may serve as a conventional plasma heating torch if for example, powder is not fed to the device.

Due to the short axial length of the device, when the handle 31 is removed, the entire device may be easily manipulated and for example inserted in conduits or cylinders for directly spraying the side walls thereof without the use of an angle cap or deflector.

The novel construction in accordance with the invention, in which the annular flow passage defined by the rod electrode and nozzle decreases in cross-sectional flow area to a minimum size and then increases in cross-sectional flow area in the downstream flow direction, may be achieved in other manners than those shown. Thus, for example, this may be achieved by suitable dimensioning and shaping of the entrance of the nozzle, as for example by providing the same with a double or even triple taper.

The construction in accordance with the invention and the novel construction of the nozzle tip provided with the double taper is applicable to all types of plasma generators and spray guns in which an arc-forming electric current is passed from a rod electrode into a nozzle and which is provided with means for passing a plasma-forming gas in contact with the arc and through the nozzle, including generators of the transferred arc type.

While the invention has been described in detail with reference to the embodiments shown, various changes and modifications which fall within the spirit of the invention and the scope of the appended claims will become apparent to the skilled artisan. The invention is therefore only intended to be limited by the appended claims or their equivalents, wherein we have endeavored to claim all inherent novelty.

We claim:

1. In a plasma torch having a nozzle electrode, a rod electrode, means for passing an arc-forming electric current between said electrodes, and means for passing a plasma-forming gas in contact with the arc and through the nozzle electrode, the improvement which comprises said rod electrode extending into the entrance end of said nozzle electrode, and the laterally adjacent portions of said rod and nozzle electrodes being shaped and dimensioned to define an annular gas flow passage therebetween decreasing in cross-sectional flow area to a minimum size and then increasing in cross-sectional flow area in the downstream flow direction of gas through said nozzle, said torch including a passage for a cooling fluid, said nozzle being a single walled nozzle having cooling ribs and extending as a wet liner directly in said cooling passage.

2. Improvement according to claim 1 in which the entrance end of said nozzle conically narrows in the direction toward the nozzle outlet and in which the portion of said rod electrode extending into the conically narrowing entrance end of said nozzle electrode includes a cylindrical portion conically tapering over a first section of its axial length and then conically tapering over a subsequent section of its axial length at a steeper angle of taper.

3. In a plasma spray gun having a nozzle electrode, a rod electrode, means for passing an arc-forming electric current between said electrodes, means for passing a plasma-forming gas in contact with the arc and through the nozzle electrode, and means for passing heat-fusible material to be sprayed into the nozzle, the improvement which comprises said rod electrode extending into the entrance end of said nozzle electrode, and the laterally adjacent portions of said rod and nozzle being shaped and dimensioned to define an annular gas flow passage therebetween decreasing in cross-sectional flow area to a minimum size and then increasing in cross-sectional flow area in the downstream flow direction of gas through said nozzle, said torch including a passage for cooling fluid, said nozzle being a single walled nozzle having cooling ribs and extending as a wet liner directly in said cooling passage.

4. Improvement according to claim 3 in which the entrance end of said nozzle conically narrows in the direction toward the nozzle outlet and in which the portion of said rod electrode extending into the conically narrowing entrance end of said nozzle electrode includes a cylindrical portion conically tapering over a first section of its axial length and then conically tapering over a subsequent section of its axial length at a steeper angle of taper.

5. In a plasma torch having a nozzle electrode, a rod electrode, means for passing an arc-forming electric current between said electrodes, and means for passing a plasma-forming gas in contact with the arc and through the nozzle electrode, the improvement which comprises the entrance end of said nozzle electrode conically narrowing in the direction toward the nozzle outlet, said rod electrode having a cylindrical portion conically tapering over a first section of its axial length and then conically tapering over a subsequent section of its axial length at a steeper angle of taper with said tapered portions extending into the entrance end of said nozzle electrode to thereby define an annular gas flow passage decreasing in cross-sectional flow area to a minimum size and then increasing in cross-sectional area in the downstream flow direction of gas through said nozzle, the exit end of said nozzle having an increased cross-sectional area and including a lateral flow passage for powdered metal to be sprayed, extending into said exit end of increased cross-sectional area at an angle inclined toward the exit end of the nozzle.

6. In a plasma torch having a nozzle electrode, a rod electrode, means for passing an arc-forming electric current between said electrodes, and means for passing a plasma-forming gas in contact with the arc and through the nozzle electrode, the improvement which comprises the entrance end of said nozzle electrode conically narrowing in the direction toward the nozzle outlet, said rod electrode having a cylindrical portion conically tapering over a first section of its axial length and then conically tapering over a subsequent section of its axial length at a steeper angle of taper with said tapered portions extending into the entrance end of said nozzle electrode to thereby define an annular gas flow passage decreasing in cross-sectional flow area to a minimum size and then increasing in cross-sectional area in the downstream flow direction of gas through said nozzle, the exit end of said nozzle having an increased cross-sectional area and including a lateral flow passage for ceramic powder extending into said exit end of increased cross-sectional area at an angle inclined toward the entrance end of said nozzle.

7. A nozzle electrode for a plasma spray gun having a single wall construction with integral cooling and strengthening ribs and having a central bore of increased diameter at its exit end provided with a lateral inlet passage for powdered metal inclined at an angle toward the nozzle outlet.

8. A nozzle electrode for a plasma spray gun having a single wall construction with integral cooling and strengthening ribs and having a central bore of increased diameter at its exit end provided with a lateral inlet passage for powdered ceramic material inclined at an angle toward the rear of the nozzle.

9. In a plasma torch having a nozzle, a rod electrode, means for passing an arc-forming electric current from said rod electrode into said nozzle and means for passing a plasma-forming gas in contact with the arc and through the nozzle, the improvement which comprises said nozzle electrode having a single wall construction provided with integral cooling and strengthening ribs, the torch defining a cooling passage formed as a socket for said nozzle electrode with the nozzle electrode positioned as a wet liner therein whereby cooling liquid passed through said cooling passage comes in direct contact with said ribs.

10. Improvement according to claim 9 in which said nozzle has a central bore of increased diameter at its exit end provided with a lateral inlet passage for powdered metal inclined at an angle toward the nozzle outlet.

11. Improvement according to claim 9 in which said nozzle has a central bore of increased diameter at its exit end provided with a lateral inlet passage for powdered ceramic material inclined at an angle toward the rear of the nozzle.

References Cited in the file of this patent
UNITED STATES PATENTS

| | | |
|---|---|---|
| 2,966,575 | Libby | Dec. 27, 1960 |
| 2,973,426 | Casey | Feb. 28, 1961 |
| 3,061,710 | Browning et al. | Oct. 20, 1962 |
| 3,077,108 | Gage et al. | Feb. 12, 1963 |